(12) United States Patent  
De Vaan et al.

(10) Patent No.: US 6,429,973 B1
(45) Date of Patent: Aug. 6, 2002

(54) METHOD AND DEVICE FOR ADJUSTING A DESIRED WHITE COLOR ON A PART OF AN IMAGE

(75) Inventors: Adrianus Johannes Stephanes Maria De Vaan; Steven Jan Willem Van Lerberghe, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/619,185

(22) Filed: Jul. 19, 2000

(30) Foreign Application Priority Data

Jul. 20, 1999 (EP) .............................. 99202384

(51) Int. Cl.⁷ .......................... G02B 27/10; G03B 21/00
(52) U.S. Cl. .................................................. 359/618
(58) Field of Search ............................ 359/618, 583, 359/629; 353/31, 34

(56) References Cited

U.S. PATENT DOCUMENTS

| | | | | |
|---|---|---|---|---|
| 5,374,968 A | * | 12/1994 | Haven ........................ | 353/31 |
| 5,738,426 A | * | 4/1998 | Daijogo ....................... | 353/31 |
| 6,137,635 A | * | 10/2000 | Nakazawa ................... | 359/621 |
| 6,139,154 A | * | 10/2000 | Haba ........................... | 353/31 |
| 6,186,629 B1 | * | 2/2001 | Iwamura ..................... | 353/31 |

* cited by examiner

*Primary Examiner*—Georgia Epps
*Assistant Examiner*—Gary O'Neill

(57) ABSTRACT

A projection device generates at least one image and adjust the color balance for a white portion of the image. A light source drives one or more electro-optical light modulation panels. A light control device comprising an LCD provided with a single electrode is associated with and cooperates with the light modulation panel(s) and is adjustable to increase output of one or more of the light modulation panels in order to adjust the color balance of the white portion of the image.

7 Claims, 1 Drawing Sheet

METHOD AND DEVICE FOR ADJUSTING A DESIRED WHITE COLOR ON A PART OF AN IMAGE

FIELD OF THE INVENTION

The invention relates to a method of adjusting a desired white color on at least a part of an image by means of a device comprising at least a light source and at least an electro-optical light modulation panel, in which method the light from the light source is converted into an image via at least the electro-optical light modulation panel.

The invention also relates to a device which is suitable for generating at least an image, at least a part of which has a desired white color, which device comprises at least a light source and at least an electro-optical light modulation panel.

BACKGROUND AND SUMMARY OF THE INVENTION

In such a known device, for example three different light modulation panels generate red, green and blue-colored parts of the image which are subsequently imaged as a single image on a projection plane by means of a projection lens situated on a side remote from the light source.

It is alternatively possible to generate parts of an image associated with three different colors consecutively in complete parts or scrolling parts by means of only a single light modulation panel.

Optical elements such as dichroic deflection mirrors, lenses, prisms etc. whose optical transmission will be slightly different for each color, are situated between the light source and the light modulation panels as well as between the light modulation panels and the projection lens. Moreover, similar devices may be slightly different due to small mechanical and/or optical deviations. Consequently, the primary colors red, green and blue and the white color will be different for each device. If the light modulation panels are, for example, LCDs, a desired white color can still be obtained by driving the LCDs in different ways. For one or two LCDs, the maximum allowable drive voltage is decreased. Due to the physical properties, inter alia the transmission drive curve, of the LCD, this will be at the expense of the maximum contrast to be realized with the LCD. As a result, the maximum contrast to be achieved for each LCD will also differ so that color errors may occur. At different maximal drive voltages of the three LCDs, the LCDs have different, non-linear drive curves so that it becomes relatively complicated to drive the three LCDs.

The same drive problem occurs if the device has only one line modulation panel.

If, moreover, the projection plane itself is not white, the human eye will observe the actual color of the projection plane instead of a white color, even when the device is adjusted correctly.

SUMMARY OF THE INVENTION

It is an object of the invention to provide a method and a device in which a desired white color can be realized in a simple manner while avoiding the above-mentioned drawbacks.

In the method according to the invention, this object is achieved in that a light control device co-operating with the light modulation panel is associated with said panel, in which, for adjusting the desired white color, the electro-optical light modulation panel is driven through at least a part to a desired maximum, which part is imaged on the part of the image, whereafter the color of the part of the image is adapted to the desired white color by means of the light control device.

By driving the light modulation panel to a desired maximum, it is possible to operate the light modulation panel in accordance with the same drive curve for each color, while the same maximum contrast can be realized for each color. As a result, the drive of the light modulation panel is relatively simple. To achieve the desired white color, the light control device is adjusted manually or automatically per color.

An embodiment of the method according to the invention is characterized in that the device comprises at least three electro-optical light modulation panels, in which a light control device co-operating with each light modulation panel is associated with said panel, in which, for adjusting the desired white color, the electro-optical light modulation panels are each driven through at least the same part to a desired maximum, which parts are imaged on the part of the image, whereafter the color of the part of the image is adapted to the desired white color by means of the light control devices.

In this way, it is possible to operate each light modulation panel in accordance with the same drive curve, while the same maximum contrast can be realized with each light modulation panel. Consequently, the drive of the light modulation panels is relatively simple.

Another embodiment of the method according to the invention is characterized in that the color of the part of the image is detected by means of a sensor, in that subsequently the detected color is compared by a control means with a desired white color, and, if the detected color does not correspond to the desired white color, the light control device(s) is (are) subsequently driven by the control means until the desired color corresponds to the desired white color.

It is even possible to realize an image with a desired white part even on a projection plane having, for example, a pastel-like color by the control means and the sensor connected thereto.

In the device according to the invention, the object is achieved in that a light control device co-operating with a light modulation panel is associated with said panel, which light control device is adjustable when driving the light modulation panel to the desired maximum, so that the part of the image has the desired white color.

The maximum drive voltage may be equal for each color so that the linearity of the drive and the contrast for each color is optimal.

BRIEF DESCRIPTION OF THE DRAWINGS

These and other aspects are apparent from and will be elucidated with reference to the embodiments described hereinafter.

In the drawings.

DETAILED DESCRIPTION OF THE PREFERRED EMBODIMENTS

Figure 1:
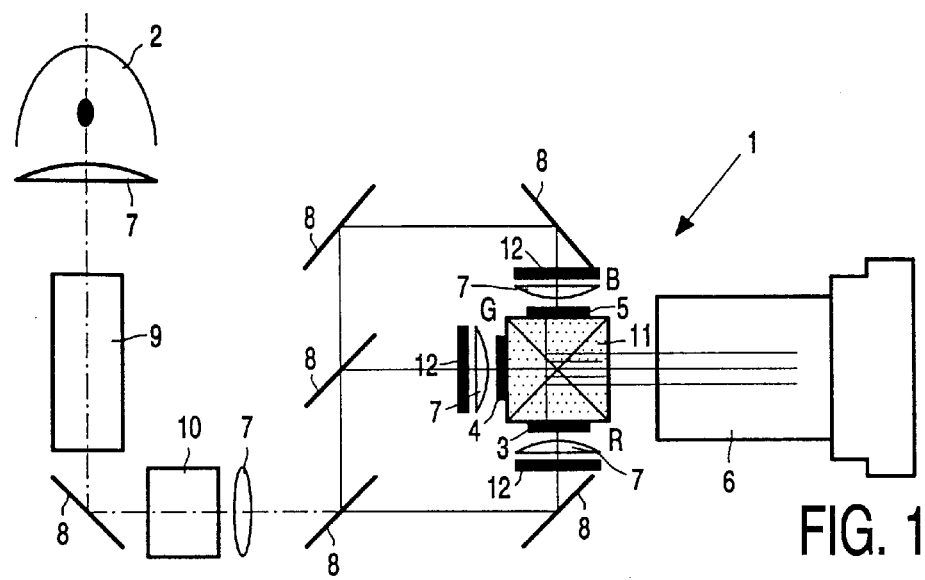
FIG. 1 shows a first embodiment of a device 1 according to the invention.

In the Figures, corresponding components are denoted by the same reference numerals.

FIG. 1 shows a device 1 according to the invention, comprising a light source 2, three electro-optical light modulation panels 3, 4, 5 with which a red R, a green G and a blue B part of an image to be imaged are realized, and a projection lens 6. The device 1 further comprises, between the light source 2 and the light modulation panels 3–5, lenses 7, (dichroic) deflection mirrors 8, PCS 9 and integrator 10. The lenses 7, (dichroic) deflection mirrors 8, PCS 9 and integrator 10 are known per se and will not be further described. The device 1 is further provided with a dichroic prism 11 situated between the light modulation panels 3–5 and the projection lens 6. The device 1 is also provided with three light control devices 12 which are situated on a side of the light modulation panels 3–5 remote from the prism 11.

Each light control device 12 is provided with an LCD element which comprises only a single electrode (single pixel). It is of course alternatively possible to use the same LCD as for the light modulation panels 3–5.

The device 1 is adjusted to a desired white color as follows. The light emitted by the light source 2 is imaged on the light modulation panels 3–5 via the optical elements 7–10. Each light modulation panel is driven by the same desired maximum permissible voltage, whereafter the LCDs 3–5 are imaged on a projection plane (not shown) via prism 11 and the projection lens 6. If the projected image has a desired white color, it is not necessary to take any further action. In most cases, the color on the projection plane will deviate from a desired white color due to the imperfections of the optical elements mentioned in the opening paragraph and the possible color of the projection plane itself. If the color of the projected image does not correspond to the desired white color, the light control devices 12 are driven, at which the color of the projected image will change. The drive of the separate light control devices is changed until the color of the projected image corresponds to the desired white color. Subsequently, arbitrary images, white parts of which have a desired white color, can be generated by only driving the light modulation panels 3–5. The control devices 12 need not be readjusted until another adjustment is desired, for example, due to a change of the color of the projection plane.

Figure 2:
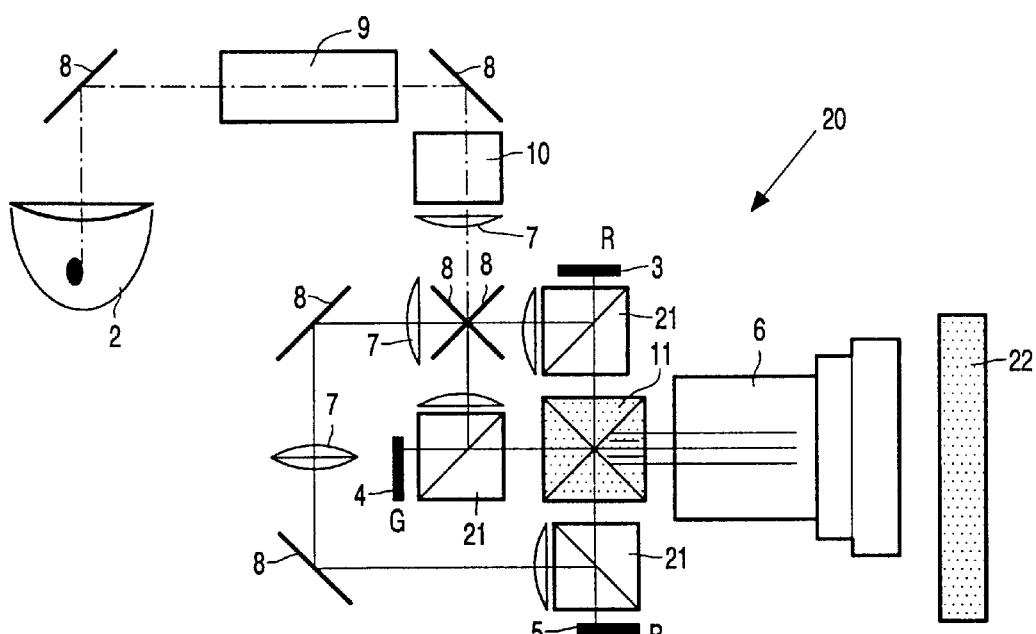
FIG. 2 shows a second embodiment of a device according to the invention.

FIG. 2 shows a second embodiment of a device 20 according to the invention, comprising a light source 2, reflective light modulation panels 3–5 and a light source 12. The device 20 is further provided with lenses 7, (dichroic) deflection mirrors 8, PCS 9, integrator 10 and elements 21 arranged between the light source 2 and the light modulation panels 3–5. The elements 21 and the dichroic prism 11 are situated between the light modulation panels 3–5 and the projection lens 6. The device 20 is further provided with a liquid crystal shutter 22 for three different colors, arranged on a side of the projection lens 6 remote from the light modulation panels 3–5. The liquid crystal shutter 22 is a special LCD element which comprises a stack of single-pixel LCD cells with color polarization filters in between. By adapting the voltages of each cell in the stack, the extent of absorption for red, green and blue can be adjusted when the light modulation panels 3–5 are driven to a desired maximum.

Figure 3:
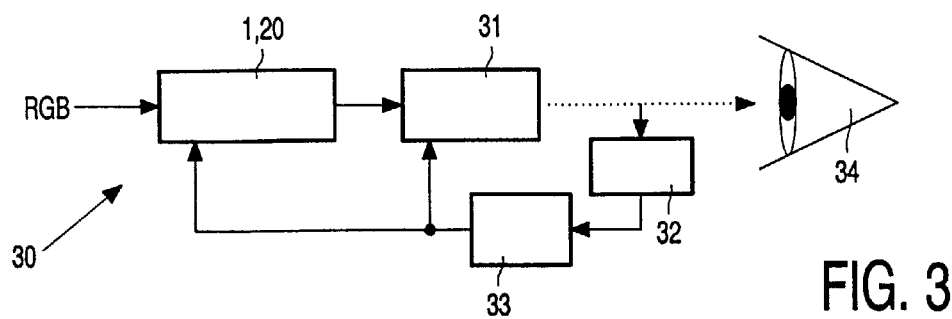
FIG. 3 shows diagrammatically a third embodiment of a device according to the invention.

FIG. 3 shows diagrammatically a third embodiment of a device 30 according to the invention, comprising a device 1, shown in FIG. 1, or a device 20, shown in FIG. 2, a projection plane 31, a sensor 32 and a control mean 33. The light-control devices 12 and 22 of the devices 1 and 20, respectively, and the light modulation panels 3–5 are driven by the control means 33. The image generated by the device 1, 20 is imaged on the projection plane 31. The projected image is detected by means of a sensor 32 and subsequently analyzed in the control means 33. If the device 1 and 20 are driven by the control means 33 in such a way that an image with a white part is to be imaged on the projection plane 31, the color detected by the sensor will be compared with the desired white color. If the two colors do not correspond, the drives of the light control devices 12 and 22 are changed by the control means 33 until the color detected by the sensor 32 corresponds to the desired white color. This color, which is present on the projection plane 31, will also be observed as white by the human eye 34.

The device according to the invention is applicable in projection systems, computer monitors, etc.

It is alternatively possible to use DMDs or other light devices as light modulation panels instead of LCDs.

It is alternatively possible to use only a single light modulation panel, in which the red, blue and green color parts of the images are consecutively generated by means of the light modulation panel. The light modulation panel may be driven in such a way that, at a specific instant, the light modulation panel generates the part associated with red, green or blue or drives this part in such a way that the parts associated with the three colors are generated in a scrolling manner across the light modulation panel. Elements should then be arranged in front of or behind the light modulation panel, so that the part associated with the relevant color is imaged in this color.

What is claimed is:

1. A projection device for generating at least one image and for adjusting color balance of a white portion of the image, comprising:
   a light source;
   an electro-optical light modulation panel; and
   a light control device comprising an LCD provided with a single electrode,
   wherein the light control device is associated with and cooperates with the light modulation panel and is adjustable to increase output of the light modulation panel in order to adjust the color balance of the white portion of the image.

2. The device of claim 1, the projection device comprising at least three electro-optical light modulation panels respectively associated with at least three respectively operating LCD-provided light control devices that are adjustable to independently increase output of the respective light modulation panels to adjust the color balance of the white portion of the image.

3. The projection device of claim 2, wherein the three light modulation panels are associated with three different colors and can be driven consecutively to produce the image as a color image.

4. The projection device of claim 1, including:
   control means for driving the light control device; and
   a sensor, coupled to the control means, that can detect the color balance of the white portion of the image.

5. A projection device for generating at least one image and for adjusting color balance of a white portion of the image, comprising:
   a light source;
   at least three electro-optical light modulation panels; and
   at least three light control devices arranged in a single LCD element that is provided with at least three stacked LCD cells each comprising a single electrode between which color polarization filters are situated,
   wherein the light control devices are associated with and cooperate with the light modulation panels and are adjustable to selectively increase output of at least one of the light modulation panels in order to adjust the color balance of the white portion of the image.

6. The projection device of claim 5, wherein the three light modulation panels are associated with three different colors and can be driven consecutively to produce the image as a color image.

7. The projection device of claim 5, including:

control means for driving the light control devices; and a sensor, coupled to the control means, that can detect the color balance of the white portion of the image.

* * * * *